United States Patent [19]

Dell'Orto

[11] 4,412,169
[45] Oct. 25, 1983

[54] CIRCUIT FOR DETECTING AND INDICATING FAULTS AND OPERATING ANOMALIES IN A SYSTEM FOR RECHARGING ELECTRIC ACCUMULATORS

[75] Inventor: Giuseppe Dell'Orto, Milan, Italy

[73] Assignee: Marelli Autronica S.p.A., Milan, Italy

[21] Appl. No.: 324,938

[22] Filed: Nov. 25, 1981

[51] Int. Cl.³ .............................................. H02J 7/00
[52] U.S. Cl. ...................................... 320/64; 322/28; 320/44
[58] Field of Search ..................... 320/48, 64; 322/28, 322/99

[56] References Cited

U.S. PATENT DOCUMENTS

| | | | |
|---|---|---|---|
| 4,000,453 | 12/1976 | Sheldrake et al. | 322/99 |
| 4,041,369 | 8/1977 | King et al. | 322/99 |
| 4,121,146 | 10/1978 | Hill | 322/99 |
| 4,316,134 | 2/1982 | Balan et al. | 322/99 |
| 4,342,022 | 7/1982 | Nichol | 320/48 X |
| 4,362,982 | 12/1982 | Akita et al. | 320/64 |

*Primary Examiner*—William M. Shoop
*Attorney, Agent, or Firm*—Sughrue, Mion, Zinn, Macpeak and Seas

[57] ABSTRACT

In a system for recharging electric accumulators, including a polyphase alternator connected to a rectifier circuit, and a voltage regulator circuit connected to the rectifier circuit and the field winding of the alternator, there is connected a circuit for detecting and indicating faults and operating anomalies. This circuit includes a signal processor circuit which is connected to the armature winding of the alternator and is operable to provide an output test signal substantially proportional to the mean value of the signal appearing, in operation, at the actual or virtual star point of the phases of the armature winding of the alternator. Generator means provide first and second predetermined reference output signals. A comparison circuit activates alarm signalling means when the test signal falls below the first reference signal, and when the test signal exceeds the second reference signal.

20 Claims, 13 Drawing Figures

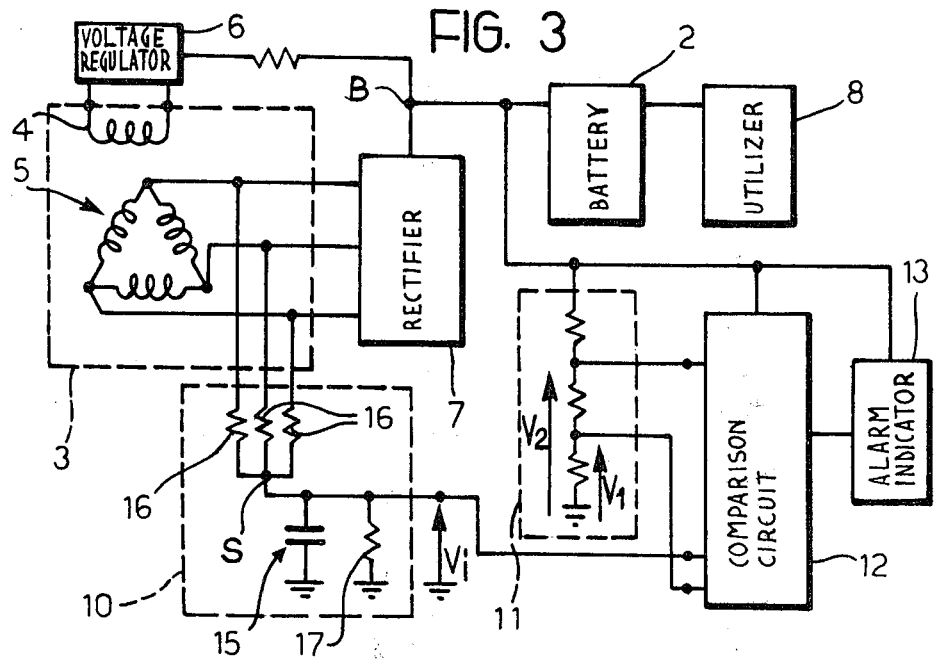
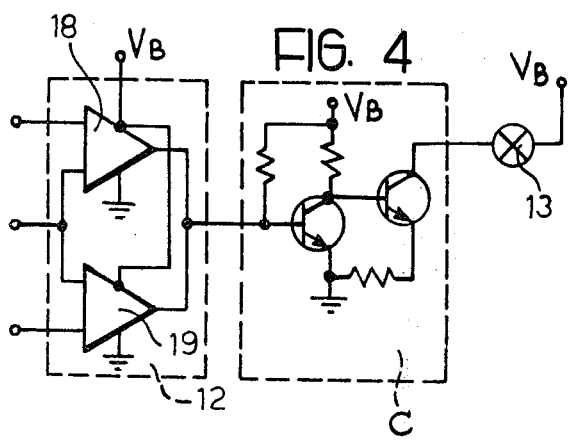

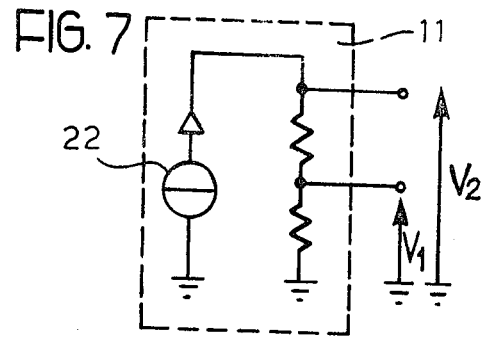
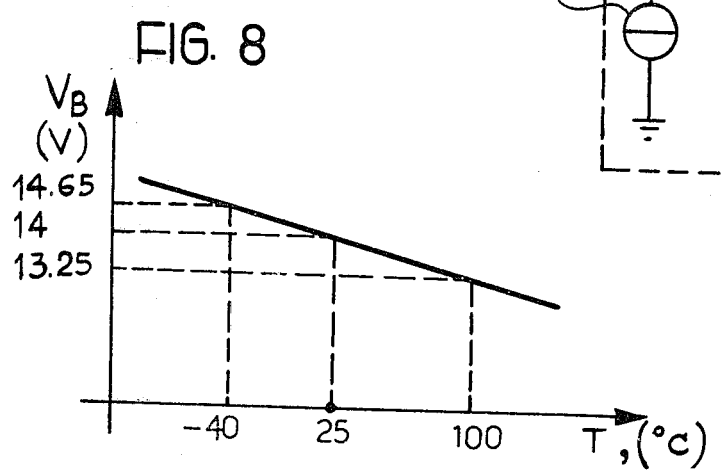
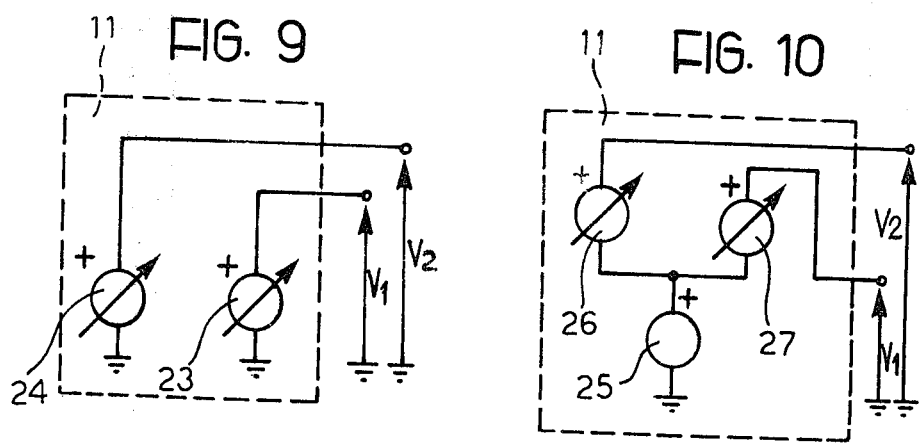
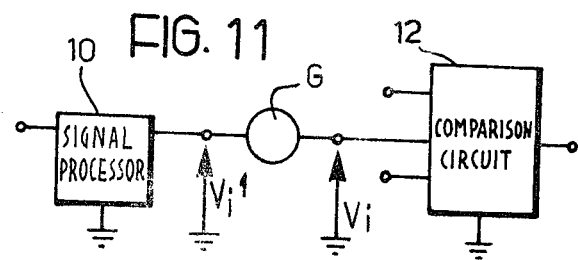

CIRCUIT FOR DETECTING AND INDICATING FAULTS AND OPERATING ANOMALIES IN A SYSTEM FOR RECHARGING ELECTRIC ACCUMULATORS

The present invention relates to circuits for detecting and indicating faults and operating anomalies in a system for recharging electric accumulators. In particular, the invention is concerned with a circuit for detecting and indicating faults and anomalies in recharging systems which include a three-phase (or, in general terms, a polyphase) alternator connected to a rectifier circuit, and a voltage regulator circuit connected to the rectifier circuit and the field winding of the alternator.

The detecting and indicating circuit according to the invention is envisaged particularly, but not exclusively, for use with recharging systems of the above-mentioned type installed in motor vehicles for recharging the electric accumulator battery or batteries carried thereby.

The present invention is based substantially on the fact that, in recharging systems of the above-mentioned type, the mean value of the voltage between the actual or virtual star point of the phases of the three-phase winding of the alternator and earth remains, in operation, substantially proportional to the recharging voltage when the recharging system is operating properly.

It has been established, moreover, that faults in the recharging system cause the aforesaid mean value to undergo appreciable variation. In particular, it has been ascertained that some types of faults cause a reduction in the mean value of the voltage, while others cause an increase in this mean value.

At present, the Applicants do not know of any existing circuit which allows the detection and indication of faults which cause an increase in the mean value of the aforesaid voltage as well as faults which cause a reduction in the mean value of this voltage.

The object of the present invention is to provide a circuit for the detection and indication of faults and operating anomalies in a system for recharging electric accumulators, which will be both simple and economic to manufacture, and which will allow the detection and indication of the greatest possible number of types of faults, particularly faults which cause an increase in the mean value of the aforesaid voltage and faults which cause a reduction in this mean value.

With a view to achieving this object, the present invention provides a circuit of the type specified above, the main characteristic of which lies in the fact that it comprises:

a signal processor circuit connected to the armature winding of the alternator and operable to provide at its output a test signal substantially proportional to the mean value of the signal appearing, in operation, at the real or virtual star point of the phases of the armature winding of the alternator;

generator means operable to provide at its output first and second predetermined references signals representing, respectively, the minimum and maximum acceptable values of the test signal;

a comparison circuit connected to the signal processor circuit and the generator means, and operable to provide at its output a control signal when the test signal falls below the first reference signal, and when the test signal exceeds the second reference signal, and indicator means connected to the comparison circuit and operable to provide an alarm indication when it receives the control signal.

With a view to achieving the abovementioned object, the invention further provides a circuit, for the detection and indication of faults and operating anomalies in a recharging system, the characteristic of which lies in the fact that it comprises:

a signal processor circuit connected to the armature winding of the alternator and operable to provide at its output a test signal substantially proportional to the mean value of the signal present, in operation, at the real or virtual star point of the alternator armature winding;

a signal translator circuit connected to the processor circuit and operable to provide at a first output a "sum" signal obtained by summing the test signal and a first d.c. signal with a magnitude which is proportional to the maximum acceptable decrement of the test signal, and to provide at a second output a "difference" signal obtained by subtracting from the test signal a second d.c. signal proportional to the maximum acceptable increment of the test signal;

signal generator means operable to provide a predetermined reference output signal;

a comparison circuit connected to the signal translator circuit and to the generator means, and operable to provide at its output a control signal when the "sum" signal falls below the reference signal, and when the "difference" signal exceeds the reference signal, and indicator means connected to the comparison circuit and operable to provide an alarm indication when it receives the control signals.

Further characteristics and advantages of the present invention will become apparent from the detailed description which follows with reference to the attached drawings, provided by way of nonlimitative example, in which:

FIG. 3 is a current diagram, partially in block form, showing a variant of the circuit of FIG. 2;

FIGS. 4 and 5 illustrate first and second partial variants of the circuit of FIG. 2;

FIGS. 6 and 7 illustrate first and second variants of generator means forming part of the circuit according to the invention;

FIG. 8 is a graph showing the variation in the voltage V, given on the ordinate, provided by an alternator of conventional type as a function of the temperature T, given on the abscissa;

FIGS. 9 and 10 illustrate further variants of generator means forming part of the circuit according to the invention;

FIG. 11 illustrates a further partial variant of the circuit according to the invention;

Figure 1:
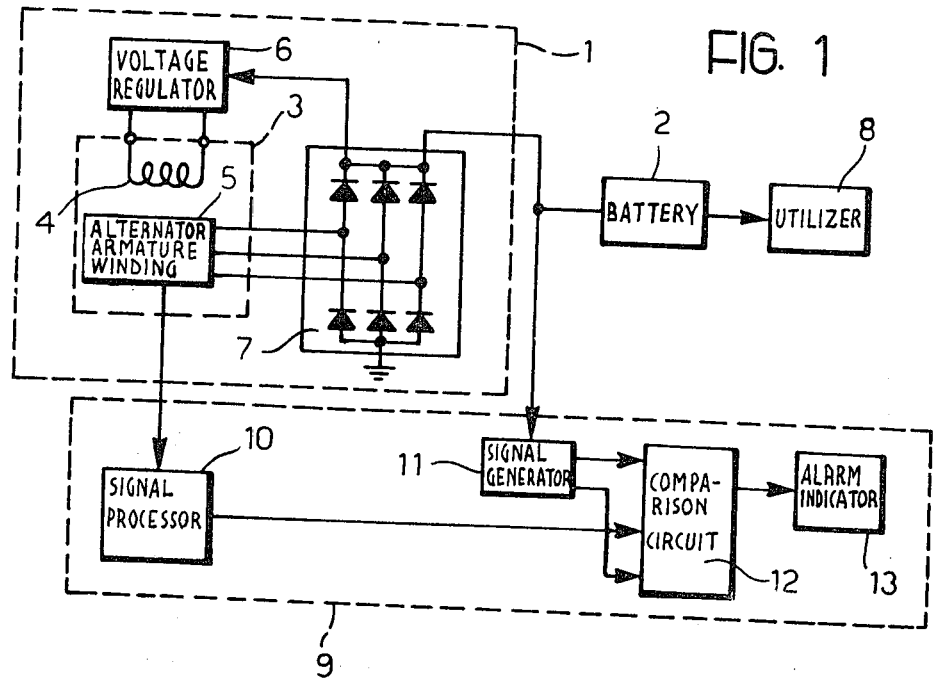
FIG. 1 is a block schematic diagram of a circuit according to the invention, which is connected to a system for recharging a battery carried by a vehicle of conventional type.

In FIG. 1 there is illustrated a conventional type of system, generally indicated 1, for recharging, for example, a battery 2 carried by a motor vehicle. The recharging system 1 includes a three-phase alternator 3 comprising a field winding 4 and a three-phase armature winding 5. The field winding 4 is connected to a voltage regulator circuit 6, whilst the three-phase winding 5 is connected to a double half-wave rectifier circuit 7 of the Graetz bridge type. The output of the rectifier circuit 7 is connected to the input of the voltage regulator circuit 6 and the battery 2.

In operation, the voltages generated in the three-phased windings 5 of the alternator 3 are rectified by the rectifier circuit 7 which supplies a recharging voltage to the battery 2. The voltage regulator circuit 6, as is known, modulates the current flowing in the field winding 4 in such a way as to maintain constant the recharging voltage (also called the regulation voltage) when variations occur in the speed of rotation of the alternator and the mains current.

Utiliser apparatus, generally indicated 8, installed on the vehicle are supplied with d.c. current by the battery 2.

A circuit for detecting and indicating faults and operating anomalies wich may occur in operation of the recharging system 1 described above is generally indicated 9. The detector and indicator circuit 9 inludes a signal processor circuit 10 connected to the three-phase winding 5 of the alternator 3 in a manner which will be described below. A reference signal generator, generally indicated 11, is connected to the output of the rectifier circuit 7. A comparison circuit 12 is connected to the signal processor circuit 10 and the reference signal generator 11. An alarm indicator device 13, for example of the visual type, is connected to the output of this comparison circuit.

Figure 2:
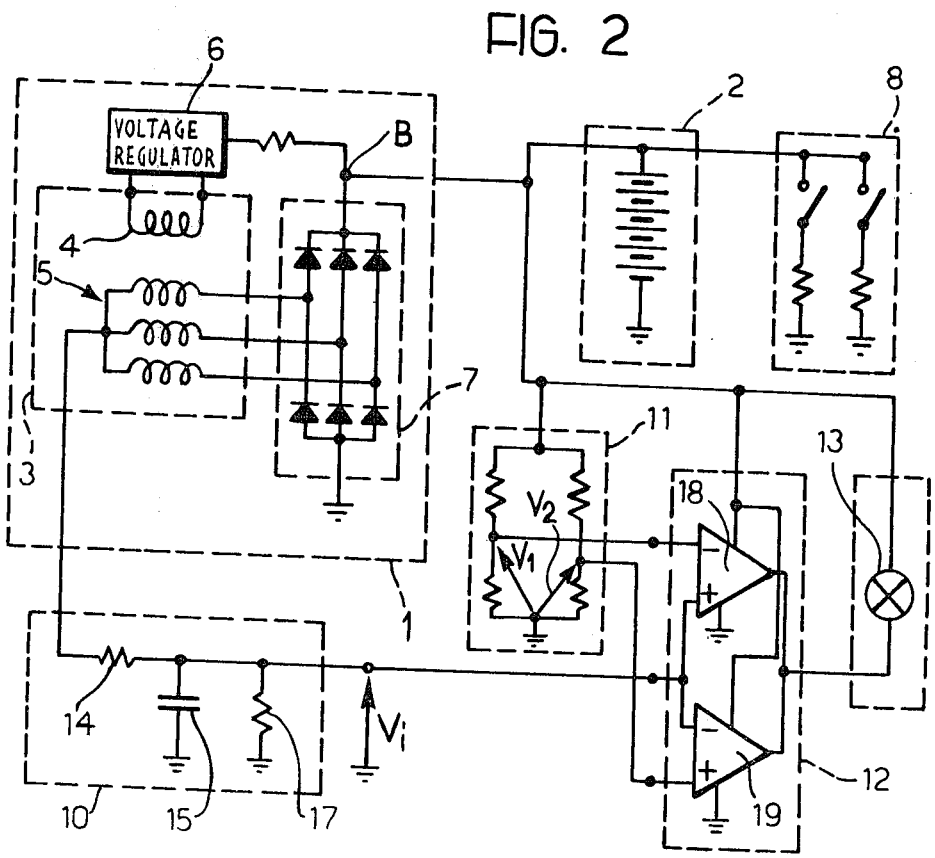
FIG. 2 is a circuit diagram of a first embodiment of the circuit of FIG. 1.

The signal processor circuit 10 can be constituted, in general, by a low-pass filter, and serves to integrate the signal present at the real or virtual star point of the three-phase winding 5 of the alternator 3. It may be constituted, for example, by a passive integrator of the RC type, as illustrated in FIGS. 2 and 3. In particular, FIG. 2 shows a possible embodiment of the signal processor circuit 10 for a case in which the windings (the phases) of the three-phase winding 5 of the alternator 3 are star-connected. In the example of FIG. 2, the integrator circuit 10 comprises a resistor 14 having one terminal connected to the star point of the three-phase winding 5 and the other terminal connected to an earthed capacitor 15.

In the case of delta connection of the phases of the three-phase winding 5 of the alternator 3, the signal processor circuit 10 can be formed in the manner illustrated in FIG. 3. In this case, the signal processor circuit 10 is constituted by a group of three star-connected resistors 16 connected between the phases of the alternator 3. The common terminal S of the three resistors 16 represents the "virtual" star point of the three-phase winding 5. In other words, in operation, the potential of the terminal S with respect to earth corresponds to the potential which would occur at the star point of a star-connected three-phase winding equivalent to the delta-connected three-phase winding illustrated in FIG. 3.

The capacitor 15 is connected between the terminal S and earth. Naturally, the signal processor circuit 10 can be constituted by any other passive or active integrator circuit of conventional type.

In operation, the signal processor circuit 10 integrates the alternating signal present at the real or virtual star point of the armature winding of the alternator and provides an output signal substantially proportional to the mean d.c. value of the signal at the star point. If the output of the rectifier circuit 7 is indicated B and the voltage between this terminal and earth (that is, the charging voltage for the battery 2) is $V_B$ then, given the symmetry of the system and the absence of faults, there is present at the real or virtual star point of the alternator an alternating signal the mean d.c. value of which is equal to half the charging voltage $V_B$. In the embodiment illustrated, therefore, the signal processor circuit 10 provides an output voltage $V_i$ substantially proportional to the mean d.c. value of the signal at the star point and, therefore, proportional to the battery charging voltage $V_B$. In particular, in the examples of FIGS. 2 and 3 if the recharging system 1 is operating properly, the voltage $V_i$ is equal to half the voltage $V_B$.

The proportionality factor between the voltage $V_i$ and the voltage $V_B$ can be varied by, for example, inserting a resistor 17 in parallel with the capacitor 15.

In general, the relation $V_i = k \cdot V_B$ holds, where k is constant.

This relation is valid for any charging voltage and for any current delivered by the recharging system provided that the alternator 3 rotates normally and no faults have occurred in the system.

Upon the occurrence of a fault in the recharging system 1, the system becomes unbalanced and the mean value of the voltage between the real or virtual star point of the alternator and earth varies with respect to the value (equal to half the voltage $V_B$) which it assumes in the absence of faults. Consequently, the signal processor circuit 10 provides at its output a signal $V_i$ different from the voltage $k \cdot V_B$. In the event of a fault or an operating anomaly in the recharging system 1, the voltage $V_i$ can, in general, rise or fall with respect to the value $k \cdot V_B$ which it assumes in the absence of faults. If, for example, one of the diodes connected to the output terminal B in the rectifier circuit 7 is short-circuited the voltage $V_i$ increases. On the other hand, in the event of, for example, a short-circuit of one of the diodes connected to earth, the voltage $V_i$ falls.

In order to detect falults and operating anomalies of the recharging system 1 which cause an increase in the voltage at the star point of the alternator winding (and therefore the voltage $V_i$), and faults which cause a fall in this voltage, there is provided a comparison circuit 12 formed, for example, in the manner illustrated in FIG. 2. This comparison circuit includes two comparator circuits 18, 19 each having a first input connected to the output of the signal processor circuit 10, and outputs which are connected together. The comparator circuits 18, 19 also have respective second inputs each connected to an output of the reference signal generator circuit 11. The latter circuit can be formed, for example, in the manner illustrated in FIG. 2. In this example, it comprises two resistive voltage dividers connected in parallel between the output of the rectifier circuit 7 and earth. These two voltage dividers are so dimensioned that they provide at their outputs two voltages, $V_1$ and $V_2$ respectively, in accordance with the following relations:

$$V_1 = (kV_B - \Delta V)$$

$$V_2 = (kV_B - \Delta V)$$

$\Delta V$ represents a voltage margin which can be chosen in dependence on the proportionality constant k. For example, if $V_B = 14V$ and $V_i = 0.25 V_B = 3.5V$, then $\Delta V$ can be chosen to be equal to 0.25V.

On the basis of what has been described above, if the recharging system 1 operates normally, one constantly has:

$$V_1 < V_i < V_2.$$

In these conditions, the outputs of the comparator circuits 18, 19 are at the "high" level and the lamp 13 connected between the output of these comparator circuits and the battery 2 remains unlit.

When a fault occurs (for example, a short-circuit to earth of one phase of the alternator, breakage of the brushes of the field winding in the alternator, breakage of a diode of the rectifier bridge, or the like) an immediate variation of the signal $V_i$ occurs which, depending on the nature of the fault, rises above the reference voltage $V_2$ or falls below the reference voltage $V_1$. This causes the output of one of the two comparator circuits 18, 19 to fall to the "low" level and consequent illumination of the lamp 13 which provides an alarm indication.

The reference voltage level generator circuit 11 can be formed, alternatively, in the manner illustrated by way of example in FIG. 3. The comparison circuit 12 can be constituted, for example, by a single integrated circuit (double comparator) of conventional type. The indicator lamp 13 may alternatively be connected between the output of the comparison circuit 12 and earth. In this case, it is necessary to connect a logic inverter circuit between the output of the comparison circuit 12 and the lamp 13 or, alternatively, it is necessary to utilise a comparison circuit formed in such a way that its output will be at the "low" level when $V_1 < V_i < V_2$ and at a "high" level when $V_i \leq V_1$ and when $V_i \geq V_2$.

The outputs of the comparator circuits 18, 19, may be connected directly together as illustrated in FIG. 2, or, alternatively, they can be connected to two separate inputs of a OR logic circuit (not shown) the output of which is connected to the lamp 13.

The output of the comparison circuit 12 can be connected directly to the lamp 13 or through a commutator circuit C, for example, of the type illustrated in FIG. 4.

In FIG. 5, there is illustrated a variant in which the outputs of the comparator circuits 18, 19 are each connected to respective indicator lamps 13a, 13b. This arrangement makes it possible to discriminate between faults according to whether they are of the type which cause an increase in the voltage $V_i$ relative to the normal value, or the type which cause a fall in this voltage. The lamps 13a, 13b may be connected to the battery (as shown in FIG. 5) or to earth, with the same considerations as discussed above with reference to a single indicator lamp being valid. Moreover, commutator circuits of the type shown in FIG. 4 may be connected between the outputs of the comparator circuits 18, 19 and the lamps 13a, 13b.

The reference voltage generator circuits illustrated in FIGS. 2 and 3 are operable to provide at their outputs reference voltages $V_1$, $V_2$ proportional to the battery charging voltage $V_B$ set by the regulator circuit 6. The circuit 9 for detecting and indicating faults and operating anomalies of the recharging system 1 has a limitation for this reason. In fact, since even the voltage $V_1$ is proportional to the voltage $V_B$ in normal operating conditions of the recharging system 1, the circuit 9 described with reference to FIGS. 2 and 3 is not able to indicate faults which cause a variation in the voltage $V_B$ relative to the set value determined by the regulator circuit 6. In other words, in the presence of a drift in $V_B$ due, for example, to ageing of some of the components of the regulator circuit 6, rather than a real fault, this drift cannot be indicated since the voltage $V_i$ and the reference voltages $V_1$, $V_2$ vary proportionally.

To obviate this disadvantage, it is necessary for the reference voltages $V_1$, $V_2$ to be independent of the regulation voltage $V_B$. FIG. 6 illustrates a circuit 11 operable to provide at its output two stabilised reference voltages $V_1$, $V_2$ which are therefore independent of the voltage $V_B$. The arrangement illustrated in FIG. 6 makes use of a resistor 20 connected in series with a Zener diode 21 between the output of the rectifier circuit 7 and earth. Two resistive voltage dividers are connected in parallel with the Zener diode 21, which provide the reference voltages at their output. Naturally, any other type of conventional circuit which can provide two different stabilised reference voltages can be adopted in place of the circuit illustrated in FIG. 6. One possible variation may be constituted, for example, by the circuit illustrated in FIG. 7. This variant envisages the use of a constant current generator 22 (of conventional type) which is connected to two resistors connected in the manner illustrated in FIG. 7.

A signal processor circuit 10, as mentioned previously, can be constituted, in general, by an integrating filter. As is known, depending on the type of integrating filter used and the values of the parameters of the components constituting this filter, the signal $V_i$ provided at the output can have a greater or lesser residual wave form (ripple). Some faults in the recharging system 1, such as the breakage of a winding in the alternator, cause a significant increase in the residual wave form present in the signal $V_i$. If the residual alternating component present in the signal $V_i$ has an amplitude greater than the value $2.\Delta V$, it is possible that the outputs of both the comparator circuits 18, 19 will change state. This then causes the illumination of the indicator lamp (or both lamps). The circuit according to the invention therefore allows the residual alternating component present in the signal $V_i$ to be used for the indication of some types of faults.

The detecting and indicating circuit according to the invention in the embodiments illustrated so far, allows the detection and indication of the following faults:
 stopping of the alternator;
 open- or short-circuiting of the phases of the alternator;
 short-circuiting to earth of the phases of the alternator;
 breaking or slipping of the transmission belt which drives the alternator from the motor vehicle engine;
 short-circuiting of the star point to earth;
 breaking (or wear of the alternator brushes;
 open- or short-circuiting of the field winding;
 open- or short-circuiting of the diodes of the rectifier bridge;
 regulator faults which, by anomalous modulation of the field current in the alternator, cause an increase or a fall in the regulation voltage beyond a certain predetermined limit;
 overload of the recharging system, which causes the level of the regulation voltage to fall below a predetermined limit;
 variation or anomalous drift of the reference voltages of the indicator circuit;
 faults in the comparator circuits (in this case the lamp does not light when the alternator is stopped, that is, before starting up, or the lamp lights when the alternator is stopped but does not go out after starting up);

complete discharge of the battery, which holds the regulation voltage firmly below the pre-established level even with the alternator operating at full power;

open circuit in the connection between the regulator circuit and the field winding of the alternator;

open-circuiting of the connection between the rectifier bridge and the regulator circuit;

open-circuiting of the connection between the regulator circuit and earth, and open-circuiting of the connection between the alternator and the signal processor circuit.

Before going on to describe further variants of the circuit according to the invention, it is necessary to discuss several considerations.

As is known it is envisaged that battery recharging systems in motor vehicles provide a charging voltage which is variable linearly with temperature. In particular, as can be seen from FIG. 8, it is required that the charging voltage falls linearly when the temperature increases. FIG. 8 shows a straight line which expresses a possible law of variation of the charging voltage $V_B$ as a function of temperature T, with a ratio of increase:

$$V_B/\Delta T = 10V/°C.$$

Since, as mentioned above, the voltage $V_i$ and the voltage $V_B$ are linked by the relation:

$$V = k \cdot V$$

In the absence of any faults, it is evident that, if the voltage regulator 6 has been arranged so that $V_B$ varies as a function of the temperature with a predetermined law, then $V_i$ will also vary as a function of temperature with the same law as $V_B$. It can be seen immediately that:

$$V_i \Delta T = K \cdot \Delta V_B / \Delta T.$$

In order to ensure extremely reliable operation of the detecting and indicating circuit according to the invention, even in the event of considerable variations in the temperature, it is necessary that the reference voltages $V_1$, $V_2$ vary as a function of the temperature with the same law of variation as $V_1$. This can be obtained, for example, in the manner illustrated in FIG. 9. This Figure shows a referemce voltage generator circuit 11 employing two voltage generators 23, 24 operable to provide an output voltage $V_1$ and an output voltage $V_2$ respectively, having a coefficient of thermal variation equal to $$\frac{k \Delta V_B}{\Delta T}.$$

This arrangement ensures that, upon a variation in temperature, the width 2·ΔV of the band in which the voltage $V_i$ can vary without an alarm indication being given remains unaltered.

FIG. 10 illustrates a simple variant of the circuit illustrated in FIG. 9. This arrangement comprises a reference level generator circuit 11 which is formed by a constant voltage generator 25 and two different voltage generators 26, 27 generating different voltages but having the same law of thermal variation as $V_i$.

Obviously, any other arrangements equivalent to those described can be devised. In general, the various arrangements possible should still be such as to allow the voltages provided at the inputs of the comparison circuit 12 to have the same law of thermal variation.

FIG. 11 illustrates an alternative variant to that shown in FIGS. 9 and 10, in which the reference voltages $V_1$, $V_2$ vary as a function of temperature with the same law of voltage variation as the voltage $V_i$. In this variant, between the output of the signal processor circuit 10 and the comparison circuit 12, there is interposed a conventional voltage generator G operable to generate a voltage $V_c$ with a law of variation which is a function of the temperature and a value such that the voltage $V_i = V_i + V_c$ (FIG. 11) is unvarying upon variations in the temperature. The voltage $V_i$ can therefore be compared with the stabilised reference voltages $$V_1 = V_{io} - V \text{ and } V_2 = V_{io} + V.$$

$V_{io}$ being the value assumed by $V_i$ in the absence of faults. Further variants may be developed easily by using current generators which vary as a function of temperature.

Summarising what has been discussed so far, the circuit according to the invention performs a comparison between a signal $V_i$ and two reference voltages ($V_1, V_2$) which are respectively equal to $V_{io} - V$, and $V_{io} + V$. The circuit provides an alarm indication when either of the following two conditions occur:

$$V_i < V_{io} - \Delta V$$

$$V_i > V_{io} + \Delta V.$$

These relations are exactly equivalent to the following:

$$V_i + \Delta V < V_{io}$$

$$V - \Delta V > V_{io}.$$

Figure 12:
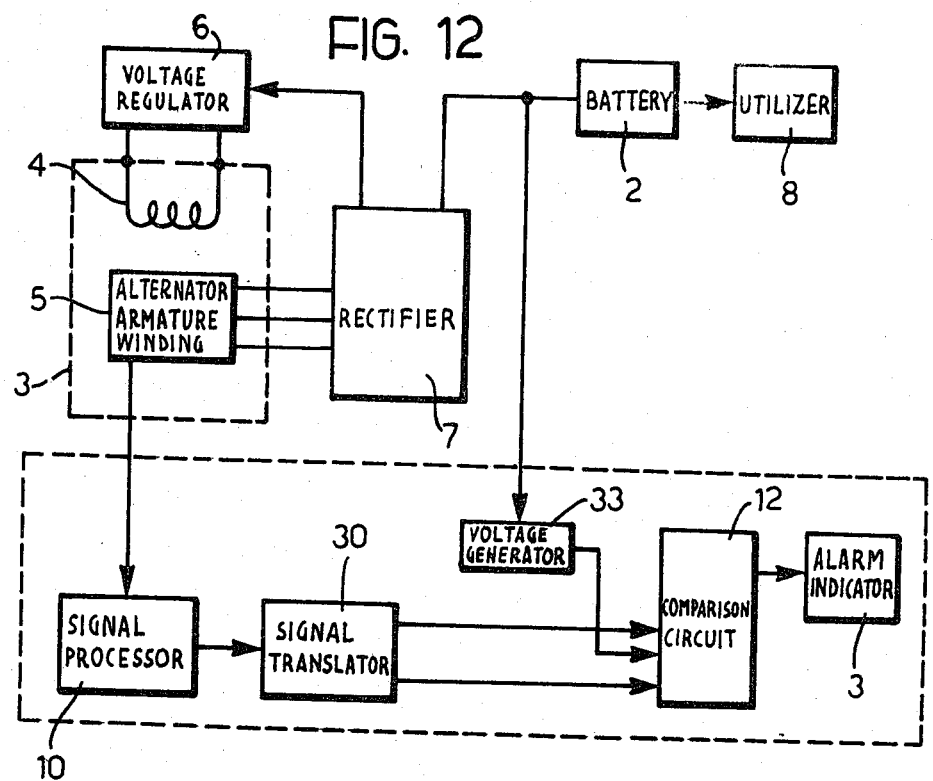
FIG. 12 is a block schematic diagram which illustrates another embodiment of the circuit according to the invention.

The equivalence between these pairs of relations immediately suggest another embodiment of the circuit illustrated by way of example in FIG. 1. The embodiment is illustrated in the block schematic diagram of FIG. 12, and the circuit of FIG. 13.

Figure 13:
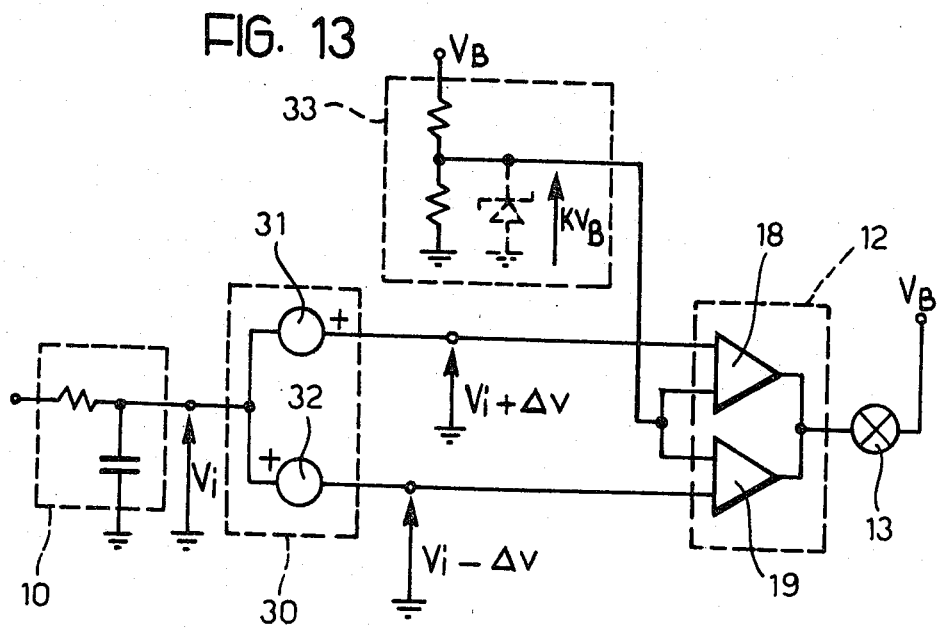
FIG. 13 is a circuit diagram of a variant of part of the circuit of FIG. 12.

In principle, this embodiment comprises the provision of a signal processor circuit 10 formed in any of the ways described above, which has its output connected to a signal translator circuit 30. This circuit may be formed, for example, in the manner illustrated in FIG. 13, and can include two voltage generators 31, 32 operable to generate a voltage ΔV. The negative terminal of the voltage generator 31 and the positive terminal of the voltage generator 32 are connected to the output of the integrator circuit 10. Therefore, the voltages $V_i - \Delta V$ and $V_i + \Delta V$, as indicated in FIG. 13, will be present at the output of the translator circuit 30. The outputs of the translator circuit 30 are connected to respective inputs of the comparator circuits 18, 19 of the comparison circuit 12. A voltage generator circuit 33 (FIGS. 12 and 13) is operable to provide at its output a voltage $V_{io} = k \cdot V_B$, and comprises, for example, a voltage divider and a possible Zener diode stabiliser. The output of this circuit 33 is connected to another input of the comparator circuits 18, 19.

In operation, the output of the comparison circuit passes from the "high" level to the "low" level when, because of a fault or an operating anomaly, the following relations occur:

$$V_i + \Delta V < kV_B$$

$$V_i - \Delta V > kV_B.$$

Again, in this latter embodiment, the indicator means may be constituted by a single lamp or two lamps, as described above with reference to FIGS. 4 and 5.

The detection and indication circuit according to the invention has a number of advantages. In the first place, it allows practically any fault which can occur in the battery charging system of a motor vehicle to be detected and indicated. Moreover, it allows the indication of faults or operating anomalies which may occur within the circuit itself. Furthermore, it is simple and economic to manufacture and, since it can be made as an integrated circuit, it does not have any problems of size.

Naturally, while the principle of the invention remains the same, embodiments and details of construction can be widely varied from that described and illustrated by way of non-limitative example, without departing from the scope of the present invention.

I claim:

1. In a system for recharging electric accumulators, including a three-phase alternator with a three-phase armature winding and a field winding, a rectifier circuit connected to said alternator, and a voltage regulator circuit connected to said rectifier circuit and said alternator field winding,
   a circuit for detecting and indicating faults and operating anomalies, comprising:
   a signal processor circuit connected to said alternator armature winding and operable to provide an output test signal substantially proportional to the mean signal value present, in operation, at a real or virtual star point of the phases of said armature winding;
   generator means operable to provide first and second predetermined stabilised reference output signals representing, respectively, a minimum and a maximum acceptable value of said test signal and which are substantially independent of the voltage appearing at said rectifier circuit output;
   a comparison circuit connected to said signal processor circuit and said generator means, and operable to provide an output control signal when said test signal falls below said first reference signal, and when said test signal exceeds said second reference signal and,
   indicator means connected to said comparison circuit and operable to provide an alarm indication when it receives said control signal.

2. A circuit as defined in claim 1, wherein said signal processor circuit comprises an integrating filter.

3. A circuit as defined in claim 2, wherein said signal processing circuit comprises a passive integrating filter of RC type.

4. A circuit as defined in claim 3, in which the three phases of said alternator armature winding are delta-connected, wherein said integrating filter comprises three resistors star-connected between the phases of said armature winding, and a capacitor connected between the common terminal of said resistors and earth.

5. A circuit as defined in claim 4, wherein said integrating filter includes three resistors having the same resistance and being star-connected between the phases of said alternator armature winding.

6. A circuit as defined in claim 3, in which the three-phases of said alternator armature winding are star-connected, wherein said integrating filter includes a resistor having a first terminal connected to the star point of said alternator, and a second terminal, and wherein a capacitor has a first terminal connected to said second terminal of said resistor and a second terminal which is earthed.

7. A circuit as defined in claim 1, wherein said generator means include a constant current generator, and first and second resistors connected to said current generator.

8. A circuit as defined in claim 1, wherein a compensation circuit is connected to said signal processor circuit, said compensation circuit compensating for thermal variations in the voltage provided at said signal processor circuit output.

9. A circuit as defined in any one of claims 1 to 6, wherein said generator means are operable to generate first and second reference signals having a coefficient of thermal variation substantially equal to the coefficient of thermal variation of said test signal.

10. A circuit as defined in claim 7, wherein each said reference signal includes a first signal component which remains constant upon temperature variations, and a second signal component having a coefficient of thermal variation substantially equal to the coefficient of thermal variation of said test signal.

11. A circuit as defined in claim 1, wherein said comparison circuit includes first and second comparator circuits, each said comparator circuit having a first input connected to said generator means, a second input connected to said signal processor circuit, and an output connected to said indicator means.

12. A circuit as defined in claim 11, wherein said indicator means include a first lamp connected to the output of said first comparator circuit, and a second lamp connected to the output of said second comparator circuit.

13. In a system for recharging electric accumulators, including a three-phase alternator with a three-phase armature winding and a field winding, a rectifier circuit connected to said alternator, and a voltage regulator circuit connected to said rectifier circuit and said alternator field winding,
   a circuit for detecting and indicating faults and operating anomalies, comprising:
   a signal processor circuit connected to said alternator armature winding and operable to provide an output test signal substantially proportional to the mean value of the signal appearing, in operation, at a real or virtual star point of the phases of said armature winding;
   a signal translator circuit connected to said processor circuit and operable to provide a first or "sum" output signal obtained by summing said test signal and a first d.c. signal having a magnitude proportional to the maximum acceptable decrement of said test signal, and a second or "difference" output signal obtained by subtracting from the said test signal a second d.c. signal proportional to the maximum acceptable increment of said test signal;
   signal generator means operable to provide a predetermined reference output signal;
   a comparison circuit connected to said signal translator circuit and said generator means, and operable to provide an output control signal when said "sum" signal falls below said reference signal, and when said "difference" signal exceeds said reference signal, and indicator means connected to said comparison circuit and operable to provide an alarm indication when it receives said control signal.

14. A circuit as defined in claim 13, wherein said signal processor circuit includes an integrating filter.

15. A circuit as defined in claim 19, wherein said signal processor circuit comprises a passive integrating filter of RC type.

16. A circuit as defined in claim 15, in which the three phases of said alternator armature winding are delta-connected, wherein said integrating filter comprises three resistors star-connected between the phases of said armature winding, and a capacitor connected between the common terminal of said resistors and earth.

17. A circuit as defined in claim 16, wherein said integrating filter includes three resistors having the same resistance and being star-connected between the phases of said alternator armature winding.

18. A circuit as defined in claim 15, in which the three phases of said alternator armature winding are star-connected, wherein said integrating filter includes a resistor having a first terminal connected to the star point of said alternator, and a second terminal, and wherein a capacitor has a first terminal connected to said second resistor terminal and a second terminal which is connected to earth.

19. A circuit as defined in any one of claims 13 to 18, wherein said comparison circuit comprises a first comparator circuit having a first input connected to said signal generator means, and a second input connected to the first output of said translator circuit, and a second comparator circuit having a first input connected to said signal generator means and a second input connected to the second output of said signal translator circuit, said comparator circuits having respective outputs connected to said indicator means.

20. A circuit as defined in claim 19, wherein said indicator means comprise a first lamp connected to the output of said first comparator circuit, and a second lamp connected to the output of said second comparator circuit.

* * * * *

UNITED STATES PATENT AND TRADEMARK OFFICE
CERTIFICATE OF CORRECTION

PATENT NO. : 4,412,169

DATED : October 25, 1983

INVENTOR(S) : Giuseppe DELL'ORTO

It is certified that error appears in the above-identified patent and that said Letters Patent are hereby corrected as shown below:

On the title page insert
-- [30] Foreign Application Priority Data

November 26, 1980 [IT] Italy..................68804/A/80--

Signed and Sealed this

Fifth Day of June 1984

[SEAL]

Attest:

GERALD J. MOSSINGHOFF

Attesting Officer    Commissioner of Patents and Trademarks